(12) United States Patent
Suzuki et al.

(10) Patent No.: US 9,154,071 B2
(45) Date of Patent: Oct. 6, 2015

(54) AC MOTOR CONTROL APPARATUS

(71) Applicant: DENSO CORPORATION, Kariya, Aichi-pref. (JP)

(72) Inventors: Takashi Suzuki, Anjo (JP); Takeshi Itoh, Nagoya (JP); Hirofumi Kako, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 130 days.

(21) Appl. No.: 13/867,392

(22) Filed: Apr. 22, 2013

(65) Prior Publication Data

US 2013/0278187 A1   Oct. 24, 2013

(30) Foreign Application Priority Data

Apr. 22, 2012   (JP) .................................. 2012-97219

(51) Int. Cl.
*H02P 27/00* (2006.01)
*H02P 21/14* (2006.01)

(52) U.S. Cl.
CPC ....................................... *H02P 21/14* (2013.01)

(58) Field of Classification Search
USPC .............. 318/801, 811, 798, 799, 254.1, 437, 318/400.01, 400.02
See application file for complete search history.

(56) References Cited

U.S. PATENT DOCUMENTS

| | | | | |
|---|---|---|---|---|
| 6,163,130 | A * | 12/2000 | Neko et al. ..................... | 318/806 |
| 6,229,719 | B1 * | 5/2001 | Sakai et al. ..................... | 363/37 |
| 7,598,698 | B2 * | 10/2009 | Hashimoto et al. ........... | 318/801 |
| 8,362,759 | B2 * | 1/2013 | Ha et al. ....................... | 324/76.15 |
| 2011/0221368 | A1 * | 9/2011 | Yabuguchi ............... | 318/400.02 |

FOREIGN PATENT DOCUMENTS

| | | |
|---|---|---|
| JP | 2001-145398 | 5/2001 |
| JP | 2001-309697 | 11/2001 |

OTHER PUBLICATIONS

Suzuki, U.S. Appl. No. 13/867,687, filed Apr. 22, 2013.
Suzuki, U.S. Appl. No. 13/867,297, filed Apr. 22, 2013.
Suzuki, U.S. Appl. No. 13/867,319, filed Apr. 22, 2013.
Suzuki, U.S. Appl. No. 13/867,282, filed Apr. 22, 2013.

* cited by examiner

*Primary Examiner* — Eduardo Colon Santana
*Assistant Examiner* — Bickey Dhakal
(74) *Attorney, Agent, or Firm* — Nixon & Vanderhye PC

(57) ABSTRACT

A control apparatus includes an electric current estimation unit to improve a responsiveness of an AC motor. The electric current estimation unit performs, at predetermined intervals, a dq conversion, a correction process, and an inverted dq conversion. The dq conversion calculates d/q axis electric current estimate values based on a detection value of a sensor phase from a sensor, and on an electric current estimate values of two phases of the AC motor other than the sensor phase from a previous cycle. The correction process corrects, during the dq conversion, the d/q axis electric current estimate values in an orthogonal direction that is orthogonal to a sensor phase axis. The inverted dq conversion calculates the electric current estimate values of the two phases other than the sensor phase based on the d/q axis electric current estimate values corrected by the correction process and smoothed by a low-pass filter process.

5 Claims, 15 Drawing Sheets

FIXED COORDINATE EXPRESSION
(W/REF TO uvw PHASE AXES)

ROTATION COORDINATE EXPRESSION
(W/REF TO dq AXES)

AC MOTOR CONTROL APPARATUS

CROSS REFERENCE TO RELATED APPLICATION

This application is based on and claims the benefit of priority of Japanese Patent Application No. 2012-97219 filed on Apr. 22, 2012, the disclosure of which is incorporated herein by reference.

TECHNICAL FIELD

The present disclosure generally relates to a control apparatus of an alternate current (AC) motor.

BACKGROUND

In recent years, electric and hybrid vehicles driven by an alternate current (AC) motor are the focus of attention in terms of their advantageous features that match a social demand for low fuel consumption and low exhaust gas emission.

For instance, in some electric vehicles, the AC motor and a direct current power source of a secondary battery are connected by way of a motor controller, which includes an inverter. The AC motor is driven by converting a direct current voltage of the direct current power source into an alternate current voltage with the inverter. In some hybrid vehicles, two AC motors and the direct current power source of the secondary battery are connected by way of the motor controller, which includes the inverter, to drive the AC motors by converting a direct current voltage of the direct current power source into an alternate current voltage with the inverter.

The control systems of such AC motors in the electric and hybrid vehicles detect two or more phase electric currents in the three-phase AC motor, by two or more electric current sensors. Based on the electric current detected from the sensors, the AC motor is controlled. However, by having many electric current sensors for one AC motor, a reduction of the size, volume, and cost of the three phase output terminals as well as the motor control system as a whole is hindered.

An effort to reduce the cost of the AC motor control system is proposed in, for example, Japanese Patent Laid-Open No. 2001-145398 (patent document 1), which is U.S. Pat. No. 6,229,719. Patent document 1 discloses reducing the number of electric current sensors by detecting the electric current of one of three phases in the AC motor (i.e., U phase) via one current sensor. In particular, based on the electric current detected in one phase (i.e., U) by the current sensor and the electric current estimate values of the other two phases (i.e., V, W phases) in a previous cycle, a d-axis electric current estimate value (i.e., an excitation-origin electric current estimate value) and a q-axis electric current estimate value (i.e., a torque-origin electric current estimate value) are calculated. Based on the smoothed values of the d-axis electric current estimate value and the q-axis electric current estimate value, which may be averaged (i.e., smoothed) by a first-order delay filter, the electric current estimate values in other two phases are also calculated, for controlling the AC motor by using the q-axis electric current estimate value (or, using both of the d-axis electric current estimate value and the q-axis electric current estimate value).

By having one electric current sensor for one AC motor (i.e., a single-phase sensing of electric current), the technique of patent document 1 is able to reduce the cost of the inverter as well as the volume or size. However, in the event of a motor torque change, which that causes, for example, a steep change of the actual electric current, the responsiveness of the electric current estimation may not be sufficient, thereby causing a delay of a catch-up of the electric current estimate value. The delay of the electric current estimate value may further lead to a torque variation or fluctuation due to the estimation error and to a lack of torque responsiveness of the AC motor, which is a required and important feature of the AC motor.

SUMMARY

The present disclosure provides for a control apparatus of an AC motor that is equipped with an electric current sensor for detecting an electric current in one of many phases of the AC motor. The control apparatus improves responsiveness in the estimation of an in-motor electric current and improves torque responsiveness demanded by the vehicle.

Based on the inventors study, the apparatus of patent document 1 estimates a d-axis electric current estimate value and a q-axis electric current estimate value based on (i) the electric current detection value in one phase, which is detected by the electric current sensor, and (ii) electric current estimate values of other two phases in a previous cycle. The electric current estimate values in the other two phases (i.e., in non-sensor phases) are calculated based on the smoothed values derived by smoothing the d-axis electric current estimate value and the q-axis electric current estimate value (i.e., the d/q axis electric current estimate values for brevity).

The inventors of the present application have found, after an intensive study of their own, that the technique of patent document 1, achieves the torque responsiveness demanded by the vehicle by improving the response speed of the electric current control. In other words, to improve the response speed of the estimation of the d/q axis electric current estimate values, the time constant of the smoothing process (e.g., a low-pass filter and its by-design time constant) are set to have a small value. However, the small values cause a large fluctuation of the d/q axis electric current estimate values and a large delay in the convergence of t the d/q axis electric current estimate values to the actual d/q axis electric current values.

The fluctuation of the estimate values on the dq plane having a horizontal d-axis and a vertical q-axis may draw a circular path circling around the actual value. The inventors further found that, after the start of such circling, the estimate values are very reluctant to converge to the real value, causing a huge delay in the convergence. Further, such circling of the convergence path is not observed when the LPF time constant is within a range that is greater than a certain value.

When the time constant is in a range that is smaller than a certain value, the convergence speed increases as the time constant decreases. However, such increase of the convergence speed stops or reverses when the time constant falls to or below a certain threshold, causing the circling of the convergence path.

The inventors found that in designing a highly responsive system that has a highly responsive torque output, simply designing (i.e., decreasing) the time constant of the LPF is not beneficial. In other words, the LPF time constant does not have a linear relationship with the electric current estimation or calculation process in total. Such a huge delay in the catch up of the electric current estimate values causes a greater error between the estimation and the actual values, and such a large error at a time of steep change of the actual electric current value due to the change of the required torque leads to an unstable control of the AC motor. Therefore, in summary, the lack of responsiveness in the electric current estimation leads to the limited changeability/adaptability of the required torque which should be stably output, thereby deteriorating the torque responsiveness of the required torque in the vehicle.

In an aspect of the present disclosure the control apparatus includes an electric current estimation unit to improve the responsiveness of the AC motor. The control apparatus is for an AC motor that includes a three-phase AC motor and an electric current detector for detecting an electric current flowing in a sensor phase, which is one phase of the three-phase AC motor.

The electric current estimation unit performs an electric current estimation process by calculating a d/q axis electric current estimate values in a rotation coordinate system of the AC motor and calculating an electric current estimate values of each phase of the AC motor, and repeats the electric current estimation process at predetermined intervals. The d/q axis electric current estimate values are based on the electric current detection value of the sensor phase detected by the electric current detector, and on the electric current estimate values of phases other than the sensor phase from a previous cycle. The electric current estimate values of each phase of the AC motor is based on smoothed values derived from smoothing the d/q axis electric current estimate values.

During the calculation of the d/q axis electric current estimate values, the electric current estimation unit calculates the electric current estimate value of the sensor phase based on the d/q axis electric current estimate values of the previous cycle. The electric current estimation unit further corrects the d/q axis electric current estimate values in a sensor phase orthogonal direction that is orthogonal to the sensor phase axis based on a sensor phase estimate error that is derived from the electric current estimate value of the sensor phase and the electric current detection value of the sensor phase detected by the electric current detector.

In such configuration, since the d/q axis electric current estimate values are corrected in the sensor phase axis orthogonal direction, the d/q axis electric current estimate values are converged linearly to the true value (i.e., the actual electric current value). Therefore, even when the LPF time constant is simply designed for achieving the required torque responsiveness, a circling behavior of the electric current estimate values is prevented, thereby improving the responsiveness of the electric current estimate values (i.e., decreasing the convergence time, converging the estimate values to the true value) and improving the electric current responsiveness and the torque responsiveness of the vehicle to a satisfactory level.

More practically, when correcting the d/q axis electric current estimate values in the sensor phase orthogonal direction, the electric current estimation unit preferably calculates a sensor phase orthogonal direction estimate error based on the sensor phase estimate error of the previous cycle and the sensor phase estimate error of a current cycle. In addition, based on the sensor phase orthogonal direction estimate error, the electric current estimation unit calculates a d/q axis electric current correction values in the sensor phase axis orthogonal direction to correct the d/q axis electric current estimate values of the previous cycle.

According to the study, the inventors found that the sensor phase orthogonal direction estimate error, which is in the sensor phase axis orthogonal direction, is calculable by using the sensor phase estimate error of the previous and current cycles based on a geometrical relationship between the electric current estimate and the true value (i.e., the actual electric current value) on the dq-plane.

Therefore, by using the sensor phase estimate error of the previous and current cycles, the sensor phase orthogonal direction estimate error is calculable. By using the sensor phase orthogonal direction estimate error, the d/q axis electric current estimate values is corrected in the sensor phase axis orthogonal direction.

In the present disclosure, the quick convergence of the d/q axis electric current estimate values to the actual electric current value is enabled by the improved responsiveness of the electric current estimation in the F/B control of the power supply for the AC motor, thereby achieving high responsiveness of the AC motor torque control, including a stable control in high speed change of the required torque.

BRIEF DESCRIPTION OF THE DRAWINGS

Other objects, features and advantages of the disclosure will become more apparent from the following detailed description disposed with reference to the accompanying drawings, in which.

DETAILED DESCRIPTION

Examples of the present disclosure are described in the following, as an application to a hybrid vehicle which is driven by an alternate current (AC) motor and an internal combustion engine.

A first embodiment of the present disclosure is described with reference to FIGS. 1 to 12.

Figure 1:
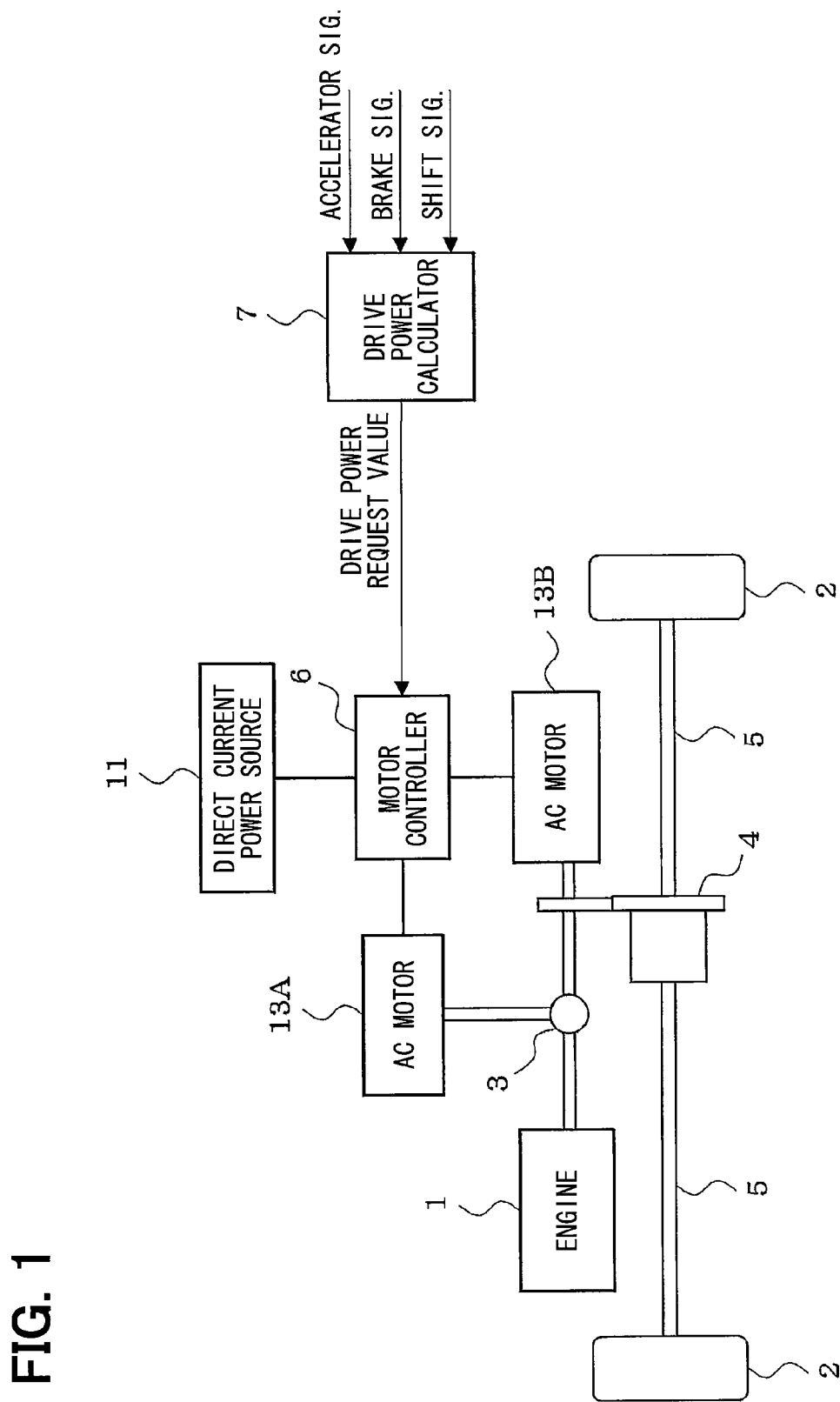
FIG. 1 is a block diagram of a drive system of a hybrid vehicle of the present disclosure.

The drive system of a hybrid vehicle is illustrated in FIG. 1. The drive system includes an engine 1, an AC motor 13A (a first motor), and an AC motor 13B (a second motor). The driving power for driving wheels 2 of the vehicle comes from the AC motors 13A, 13B and is transmitted to a shaft of the AC motor 13B, which is combined with an output from the engine 1. Specifically, the crank shaft of the engine 1 is connected to the shaft of the AC motor 13A and to the shaft of the AC motor 13B though a power splitting mechanism 3 (e.g., a planetary gear), and the shaft of the AC motor 13B is further connected to a wheel shaft 5 through a differential gear 4.

Figure 2:
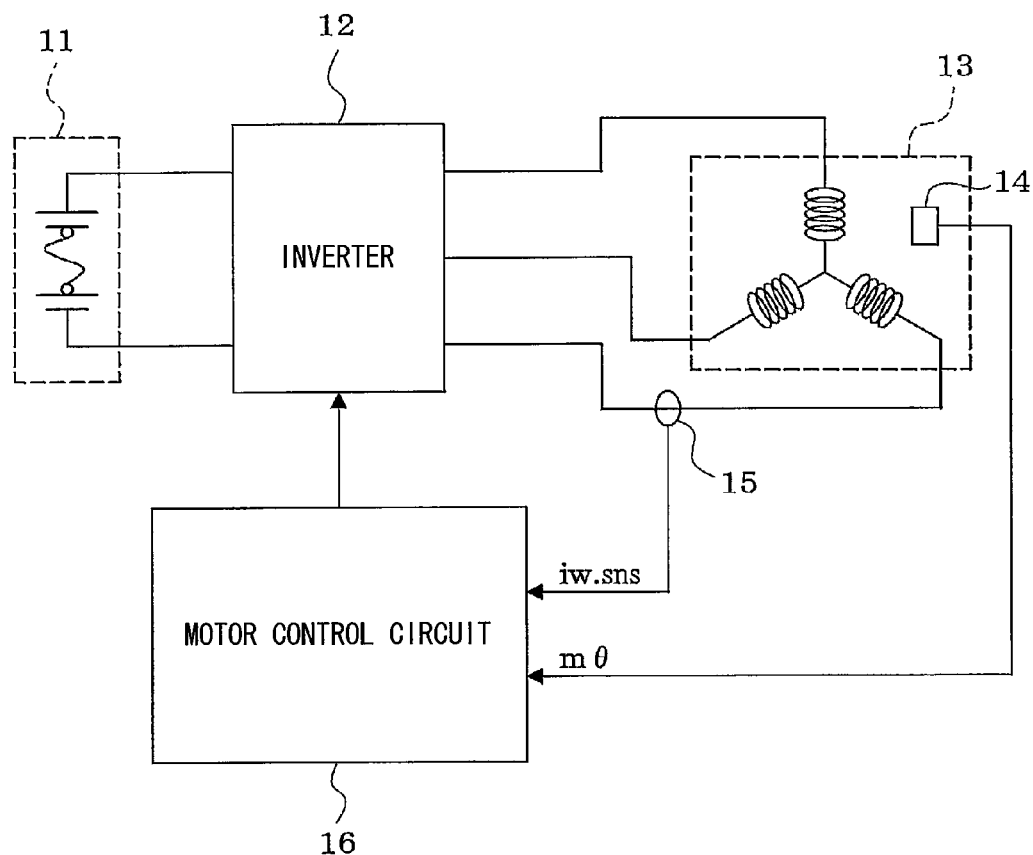
FIG. 2 is a block diagram of an alternate current (AC) motor control system of the drive system.

The AC motors 13A, 13B are connected to a direct current power source 11 through a motor controller 6, which includes, for example, an inverter 12 and a motor control circuit 16 (FIG. 2). The power source 11, which may be a secondary battery, may supply the direct current for the AC motors 13A, 13B or may receive the direct current that is returned (i.e., charged) from the AC motors 13A, 13B through the motor controller 6.

The drive system of the hybrid vehicle also includes a drive power calculator 7 that controls the hybrid vehicle. The drive power calculator 7, which is a computer or a similar component, detects a driving condition of the vehicle by reading signals from various sensors and devices, such as an accelerator sensor, a brake switch, and a shift switch.

The drive power calculator 7 transmits and receives a control signal and a data signal to and from an engine control circuit that controls an operation of the engine 1 and the motor control circuit 16 that controls an operation of the AC motors 13A, 13B. The drive power calculator 7 controls the drive power of the engine 1 and the AC motors 13A, 13B by outputting a drive power request value according to the driving condition of the vehicle.

The AC motor control system in the hybrid vehicle is described next with reference to FIG. 2. The control systems of the AC motors 13A, 13B are substantially the same. Therefore, the following description designates the motors 13A, 13B simply as an AC motor 13.

The direct current power source 11 implemented as a secondary battery is connected to the inverter 12 of three phase voltage control type, and the inverter 12 drives the AC motor 13 (i.e., an electric motor). Further, the inverter 12 may be connected to the direct electric current power source 11 through, for example, a voltage-boost converter.

The AC motor 13 is a three phase permanent magnet-type synchronous motor, which includes a built-in permanent magnet, and is equipped with a rotor position sensor 14 that detects a rotation position (i.e., a rotation angle) of the rotor. An electric current sensor 15 detects an electric current in one phase (i.e., described as a "sensor phase" hereinafter) among plural phases of the AC motor 13. In the present embodiment, the electric current in a W phase is detected as the sensor phase by the electric current sensor 15. Further, the AC motor 13 may be an induction motor or a synchronous motor of other types, other than the permanent magnet-type synchronous motor.

The inverter 12 drives the AC motor 13 by converting a DC voltage into three-phase AC voltage of U, V, W according to a 6 arm voltage instruction signals UU, UL, VU, VL, WU, WL.

The motor control circuit 16 performs a torque control by adjusting the AC voltage that is applied to the AC motor 13 so that an output torque of the AC motor 13 is controlled to have a target torque (i.e., an instructed torque value).

To control the deviation between an electric current instruction value and an electric current estimate value, in which the electric current instruction value is based on the instructed torque value and the electric current estimate value is based on an output of the electric current sensor 15, an electric current feedback (F/B) control of power supply for the AC motor 13 is performed in the following manner.

Figure 3:
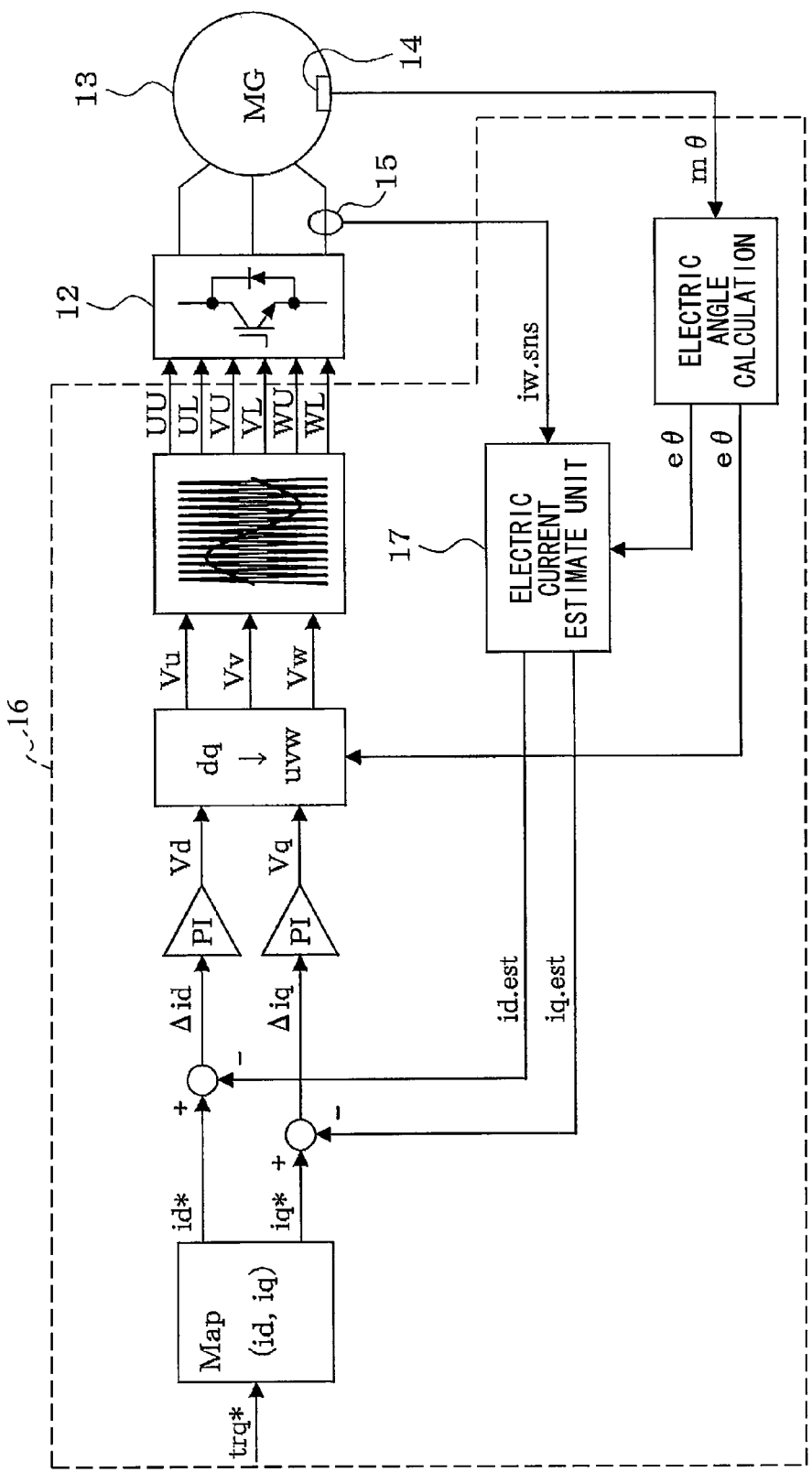
FIG. 3 is a block diagram of a current feedback control of the AC motor control system.

With reference to FIG. 3, the motor control circuit 16 calculates an instructed electric current vector according to, for example, a map or an equation based on an instructed torque value (trq*). The instructed electric current vector is represented in a rotor coordinate system (i.e., a rotating d-q coordinate system) that is set on the rotor of the AC motor 13, as a combination of a d-axis electric current instruction value (id*) and a q-axis electric current instruction value (iq*).

An electric angle (eθ) is calculated based on the rotor position (mθ) of the AC motor 13, which is detected by the rotor position sensor 14. Based on the electric angle (eθ) of the AC motor 13 and the electric current detection value (iw.sns) of the sensor phase (i.e., the W phase), which is detected by the electric current sensor 15, an electric current estimate unit 17 calculates an estimate electric current vector in the rotation coordinate system. The estimate electric current vector includes a d-axis electric current estimate value (id.est) and a q-axis electric current estimate value (iq.est), which may be simply be referred to as the d/q axis electric current estimate values (id.est, iq.est). The electric current estimate unit 17 may be referred to as an electric current estimation unit in claims.

An instructed voltage vector is calculated based on the d-axis electric current estimate value (id.est) and the q-axis electric current estimate value (iq.est). Specifically, a d-axis voltage instruction value (Vd) is calculated according to, for example, a PI control, which reduces a deviation (Δid) between the d-axis electric current instruction value (id*) and the d-axis electric current estimate value (id.est). Similarly, a q-axis voltage instruction value (Vq) is calculated according to the PI control so that a deviation Δiq between the q-axis electric current instruction value (iq*) and the q-axis electric current estimate value (iq.est) is reduced. The d-axis voltage instruction value (Vd) and the q-axis voltage instruction value (Vq) may be referred to as the instructed voltage instruction (Vd, Vq).

Based on the instructed voltage vector (Vd, Vq) and the electric angle (eθ) of the AC motor 13, three phase voltage instruction values Vu, Vv, Vw are calculated. The values Vu, Vv, Vw are converted by, for example, a sine wave PWM control method into three phase 6 arm voltage instruction signals UU, UL, VU, VL, WU, WL, and the signals UU, UL, VU, VL, WU, WL are outputted to the inverter 12. In such manner, the feedback control of the power supply for the AC motor 13 is performed to reduce the deviation between the electric current instruction values (id*, iq*), which are based on the instructed torque value, and the d/q electric current estimate values (id.est, iq.est), which are based on the output of the sensor 15.

Figure 4:
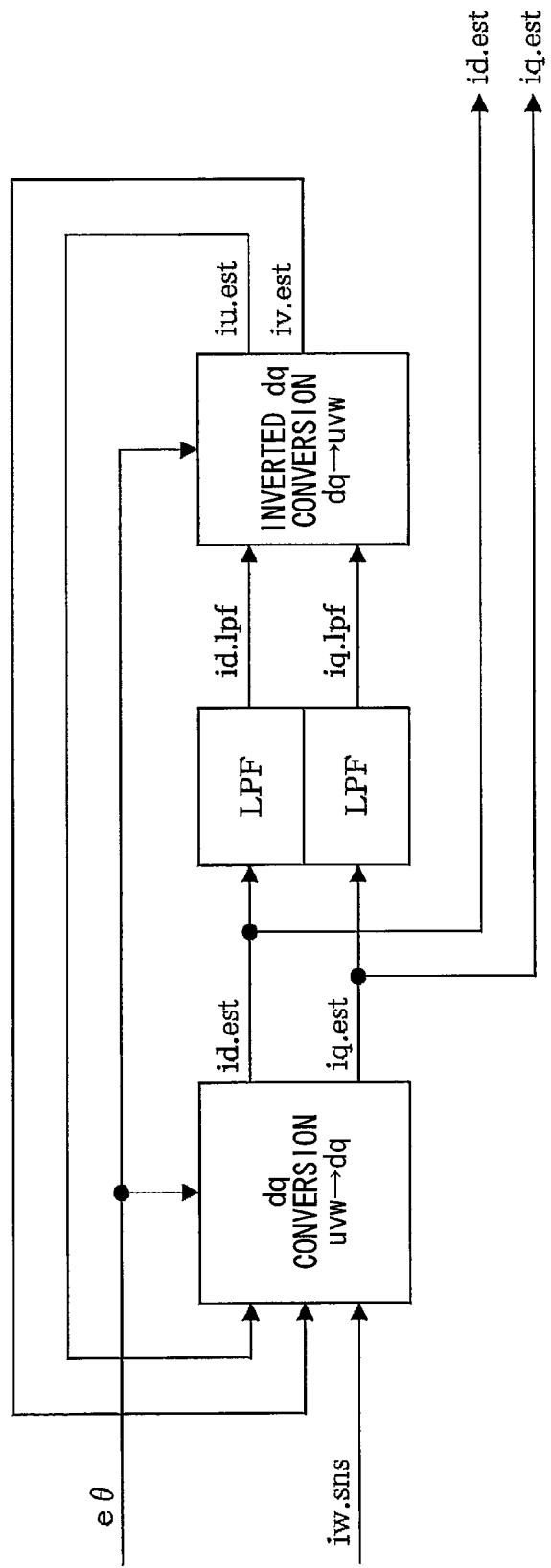
FIG. 4 is a block diagram of a system that determines an electric current estimate as a comparison example.

With reference to FIG. 4, a comparison example of the estimation of the electric current in the AC motor 13 based on the inventors' study is shown. In this example, a system estimates an electric current by repeatedly performing a dq conversion and an inverted dq conversion at predetermined intervals. Specifically, the dq conversion calculates the d/q axis electric current estimate values (id.est, iq.est) based on the electric current detection value (iw.sns) in the W phase (i.e., the sensor phase) detected by the sensor 15 and the electric current estimate values (iu.est, iv.est) in the other two phases of U and V in a previous cycle. The inverted dq conversion calculates the electric current estimate values (iu.est, iv.est) in the other two phases of U and V based on smoothed values (id.lpf, iq.lpf) by performing a low-pass filter (LPF) process (e.g., an "annealing" process or a first order lag process) on the d/q axis electric current estimate values (id.est, iq.est) derived from the dq conversion.

Accordingly, it is understood that a time constant of the LPF process for processing the d/q axis electric current estimate values (id.est, iq.est) controls the change of (i.e., limits the speed of) the d/q axis electric current estimate values (id.est, iq.est).

Therefore, when actual electric current values of the d/q axis have suddenly changed, a catch-up speed of the d/q axis electric current estimate values (id.est and iq.est) for reaching the change of the actual d/q axis electric current values (i.e., responsiveness of electric current estimation, or est-responsiveness) is controlled by the time constant of the LPF. Such responsiveness does not matter when a motor is used in a stable condition, such as a required torque/rotation numbers strictly limited to a few predetermined values. However, when the motor is used for driving a hybrid vehicle or the like, the required torque or rotation number may steeply and continuously change, depending on, for example, the accelerator/brake operation and road surface conditions, thereby leading to a steep change of the power supply for the motor.

Therefore, if the responsiveness of the electric current estimation to the actual electric current value is insufficient, the feedback control of the electric current in a motor controller may become defective or unstable. Further, the motor itself or the motor controller may be seriously damaged, due to the delay and/or error of the estimation (i.e., the delay in a catch-up of an electric current estimate vector relative to an actual electric current vector), or other factors such as an excessive electric current flowing therein for a short time. In other words, the responsiveness of the electric current estimation a primary technical factor in a motor control system for controlling the driving motor in the vehicle or for controlling the motor in any kind of machine, which may have a level of steep electric current change.

Figure 5A:
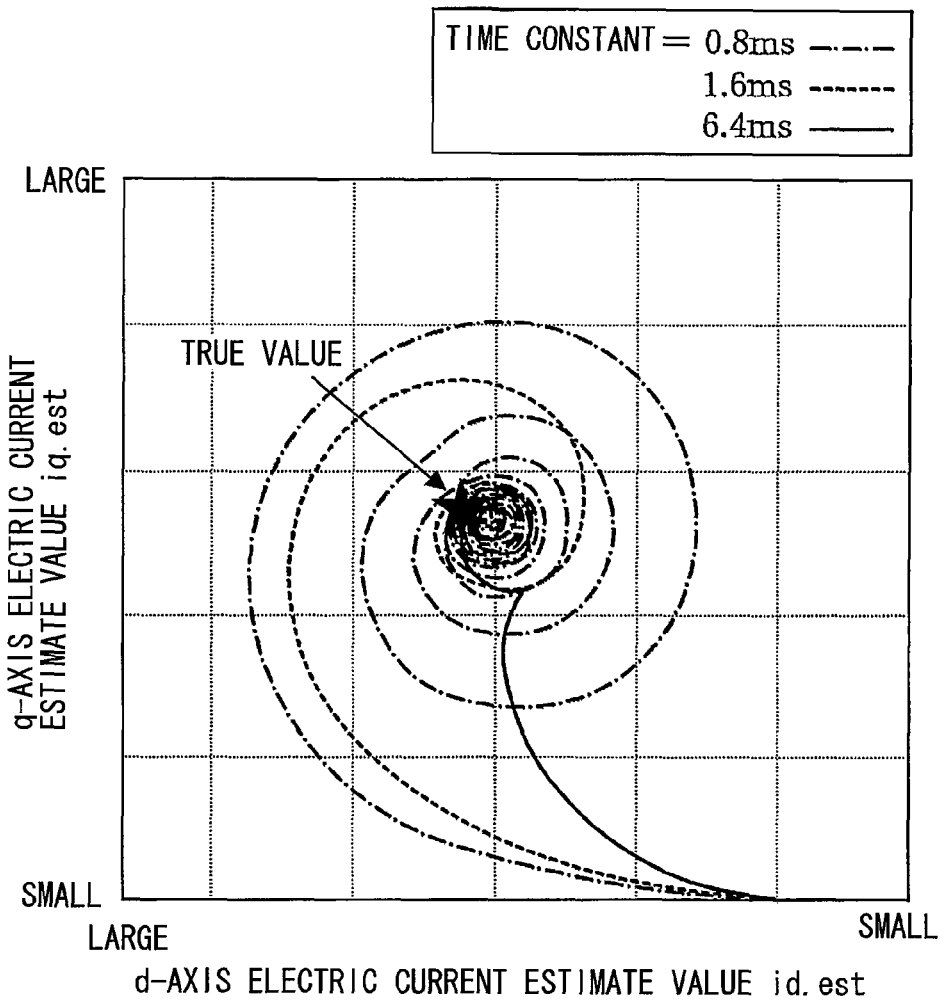
FIGS. 5A and 5B are graphical views of the electric current estimate determined by the system of FIG. 4 as the comparison example.
Figure 5B:
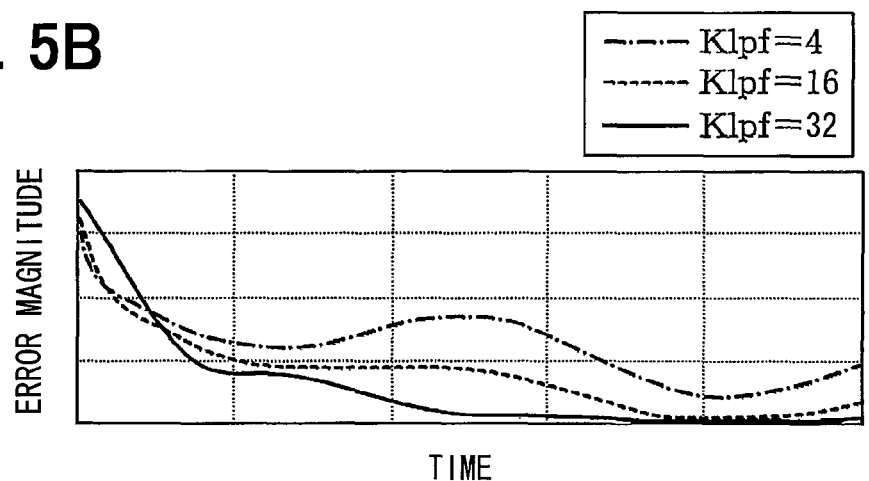

With reference to FIGS. 5A and 5B, a simulation of an electric current estimate vector based on the system of FIG. 4 is illustrated. The electric current estimate vector is illustrated for a stepwise change of relationship between responsiveness of electric current estimation and the LPF time constant. In other words, the number of annealing cycles in the first order for a change of the actual electric current vector from zero to a certain value. FIG. 5A illustrates a behavior of the electric current estimate vector on a dq plane, and FIG. 5B illustrates a change of errors, where the vertical axis is a magnitude of an estimate error vector and the horizontal axis is time.

Based on FIGS. 5A and 5B, the LPF time constant in a range above a certain value leads to an improvement of responsiveness of the electric current estimation. However, when the time constant is smaller than the range, the estimate electric current vector draws a circular path on the dq plane as the time constant decreases, leading to a steep deterioration of the responsiveness. Although the range may change depending on the rotation number of the motor, the motor, which drives the hybrid vehicle, may suffer due to the deteriorated responsiveness in a wide rotation number range, e.g., from stopping state to an upper limit of the rotation number. Therefore, a fundamental countermeasure for preventing such deteriorated responsiveness is needed.

Figure 6:
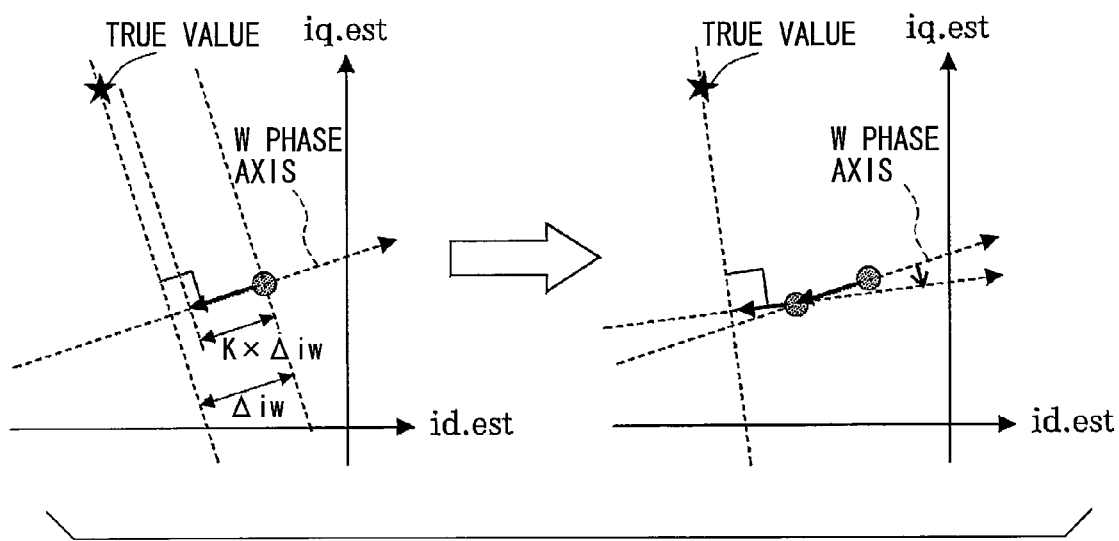
FIG. 6 is an illustration of an estimate value behavior regarding the electric current estimate in the comparison example.

The analysis result of the behavior of the estimate vector, which was realized by the inventors, are illustrated in FIG. 6. The estimate vector representing the d/q axis electric current estimate values derived from the sensor phase electric current detection value from the sensor 15 and the electric current estimate values of other two phases in a previous cycle (i.e., derived by the comparison example of FIG. 4) moves only in a sensor phase axis direction on the dq plane relative to a previous estimate vector. In such a case, the distance of the movement of the estimate vector along the sensor phase axis is calculated as a product of the $\Delta$iw and a coefficient K. The coefficient K is determined according to characteristics of the LPF that processes the d/q axis electric current estimate values (e.g., a time constant).

Figure 7A:
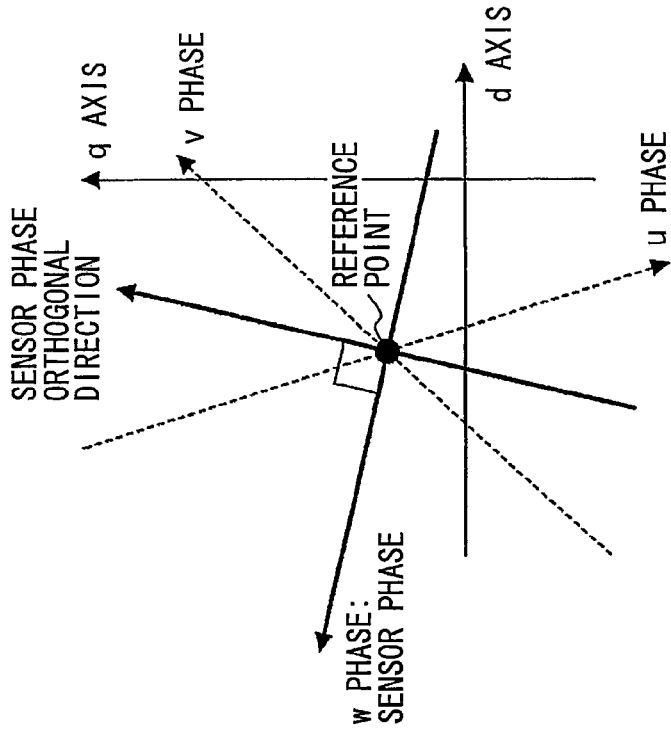
FIGS. 7A and 7B are illustrations of a sensor phase axis direction and an orthogonal direction orthogonal to the sensor phase axis.
Figure 7B:
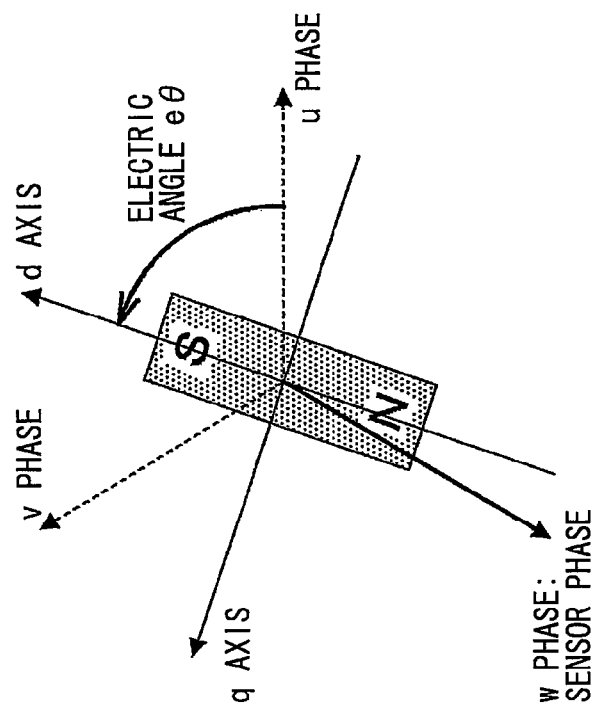

The direction of the sensor phase axis on the dq plane is illustrated in FIGS. 7A and 7B, where the reference point is a start point of a locus of id.est iq.est plot. The W phase is shown as an example of the sensor phase, and the sensor phase axis of W phase is defined as an axis of 120 degrees shifted/rotated from U phase axis. On the dq plane, U/V/W phase axes, which are fixed coordinate axes in nature, are rotated in reverse relative to the motor rotation direction due to the rotation of the motor. Therefore, the path of the electric current estimate vector draws either an arc shape or a swirl shape, which is caused by the rotation of the sensor phase axis and the movement of a vector pointed position on such axis.

Figure 8:
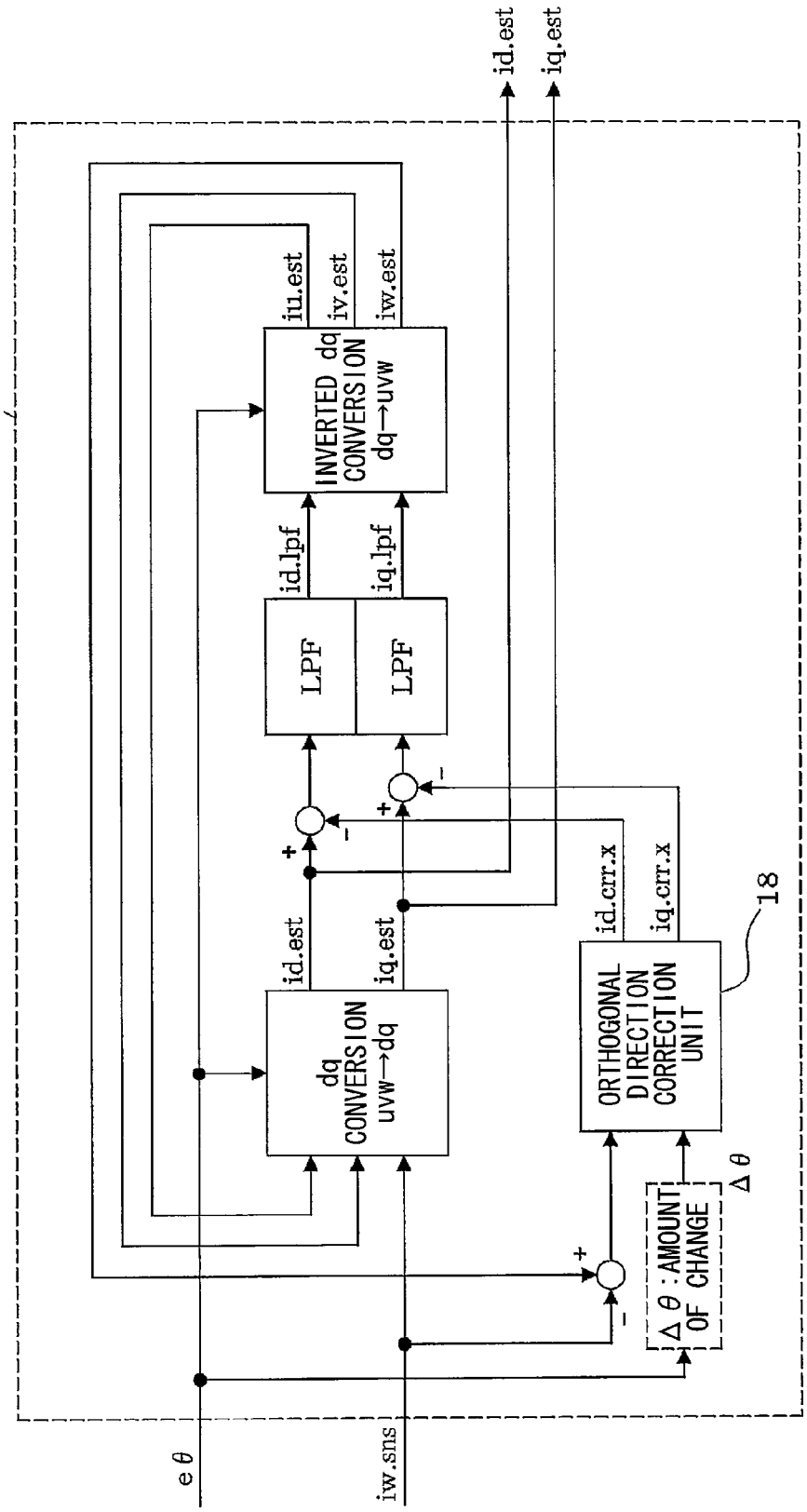
FIG. 8 is a block diagram of an electric current estimate unit of the AC motor control system in a first embodiment of the present disclosure.

Therefore, as a solution of the situation, when the d/q axis electric current estimate value are calculated based on the electric current detection value from the sensor 15 and the electric current estimate values of other two phases in a previous cycle, the calculated value of the d/q axis electric current estimate value is corrected in the present embodiment according to the vector component in an orthogonal direction that is orthogonal to the sensor phase axis. Such correction is provided in equation 1, and is illustrated in the electric current estimate unit 17 of the present embodiment as shown in FIG. 8. In equation 1, "n" indicates the current cycle and "n−1" indicates the previous cycle.

(Equation 1)

$$\begin{bmatrix} id.est(n) \\ iq.est(n) \end{bmatrix} = \begin{bmatrix} \cos(e\theta) & \cos(e\theta - 120°) & \cos(e\theta + 120°) \\ -\sin(e\theta) & -\sin(e\theta + 120°) & -\sin(e\theta + 120°) \end{bmatrix} \begin{bmatrix} iu.est(n-1) \\ iv.est(n-1) \\ iw.sns(n) \end{bmatrix} - \begin{bmatrix} id.ccr.x \\ iq.crr.x \end{bmatrix} \quad (1)$$

Figure 9:
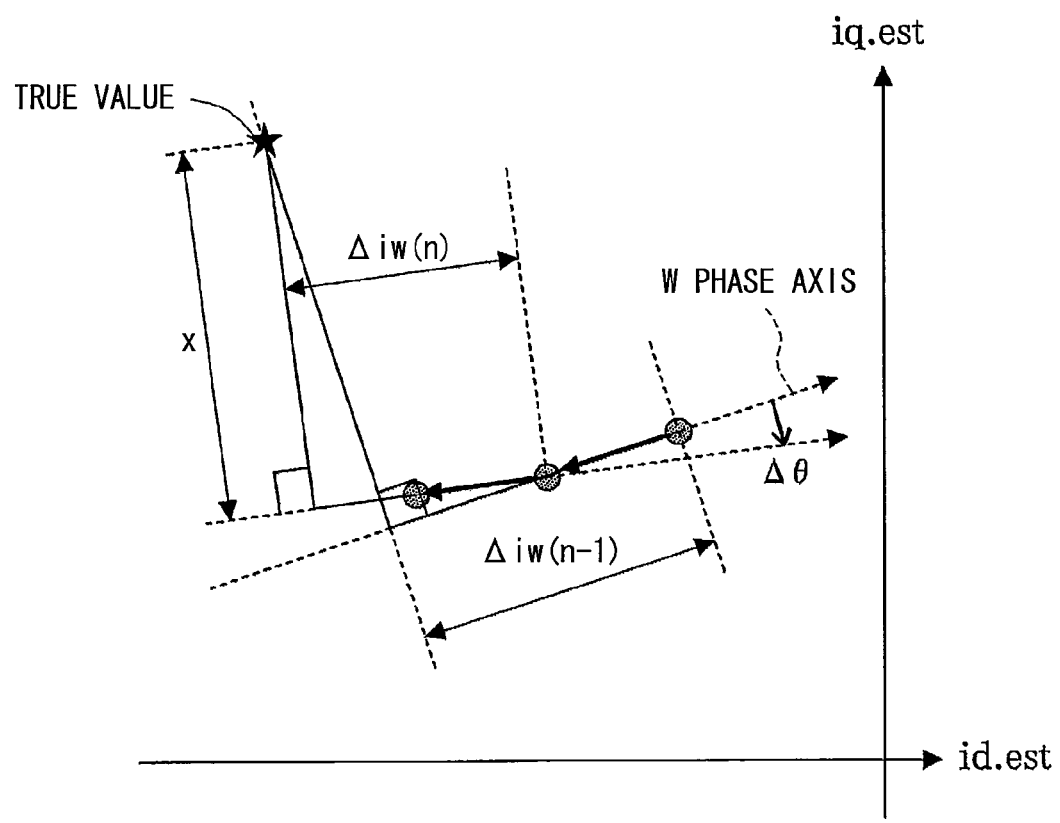
FIG. 9 is an illustration of an error x of the electric current estimate in the orthogonal direction that is orthogonal to the sensor phase.

A parameter "x" is a sensor phase orthogonal direction component of the estimate error vector, as shown in FIG. 9, and may be referred to as a sensor phase orthogonal direction estimate error.

The parameter "x" is calculable based on known values in the previous or more prior cycles such as a shift amount of the electric angle (i.e., a difference between the angle in the current cycle and the angle in the previous cycle), a sensor phase electric current detection value in the previous cycle and the like.

For example, the parameter "x" is derived by analyzing the positional relationship among the actual electric current vector, the electric current estimate vector, the sensor phase axis, and the sensor phase orthogonal axis, and such analysis is reduced to equation (2).

(Equation 2)

$$x = \frac{\cos\Delta\theta}{\sin\Delta\theta} \left\{ \Delta iw(n) - \frac{1}{\cos\Delta\theta} \left(1 - K\sqrt{\frac{2}{3}}\right) \Delta iw(n-1) \right\} \quad (2)$$

In the above, $\Delta$iw is a sensor phase estimate error (i.e., W phase), which is the estimation error in the sensor phase, and is a difference between the electric current estimate value iw.est of the sensor phase and the electric current detection value iw.sns of the sensor phase. Accordingly, Δiw(n) is the sensor phase estimate error of the current cycle and Δiw(n−1) is the sensor phase estimate error of the previous cycle. The electric current estimate value iw.est of the sensor phase is calculated either by the following equation 3 or at a time of calculation of electric current estimate values of the other two phases by the inverted dq conversion based on the d/q axis electric current estimate values after the LPF process.

(Equation 3)

$$iw.est = \sqrt{\frac{2}{3}} \, [\, \cos\theta w \quad -\sin\theta w \,] \begin{bmatrix} id.lpf \\ iq.lpf \end{bmatrix} \quad (3)$$

Further in equation 2, Δθ is an amount of change of the electric angle (i.e., a electric angle shift amount) between the current cycle and the previous cycle, which is an amount of rotation of the sensor phase axis on the dq plane. The electric angle shift amount Δθ can be calculated as a difference between the current electric angle θ(n) and the previous electric angle θ(n−1).

Figure 10:
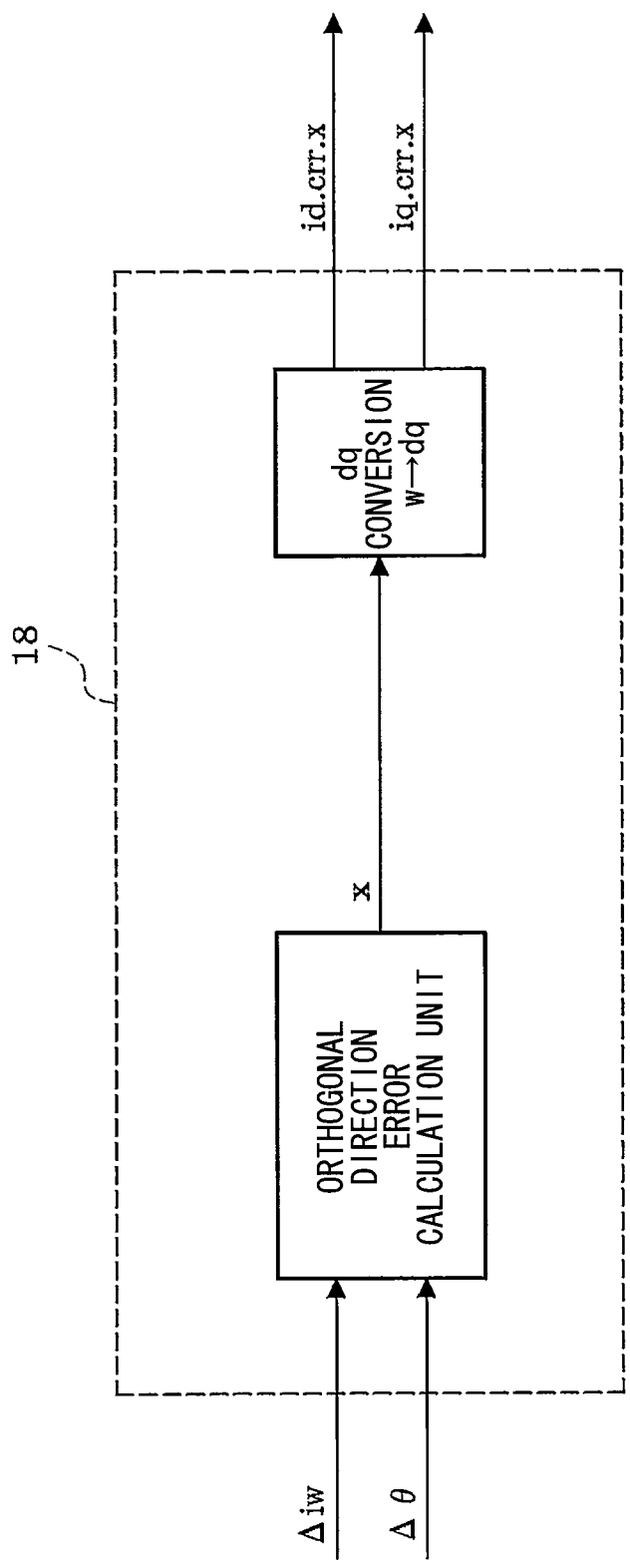
FIG. 10 is a block diagram of an orthogonal direction correction unit of the electric current estimate unit of FIG. 8.

With reference to FIG. 10, an orthogonal direction correction unit 18 of the electric current estimate unit 17 is illustrated. The orthogonal direction correction unit 18 calculates a correction of the sensor phase orthogonal direction. The orthogonal direction correction unit 18 may receive, as an input, the sensor phase estimate error Δiw and the electric angle shift amount Δθ to calculate the sensor phase orthogonal direction error x. Based on the calculated value of x, the orthogonal direction correction unit 18 performs the dq conversion for calculating a sensor phase orthogonal direction correction amount for the d-axis (id.crr.x) and for the q-axis (iq.crr.x). The phase angle to be taken as an input of the dq conversion for the conversion of the orthogonal component relative to the sensor phase is a value that is derived by adding 90 degrees to a phase angle of the sensor phase (θw), as provided in equation 4.

(Equation 4)

$$\begin{bmatrix} id.crr.x \\ iq.crr.x \end{bmatrix} = \sqrt{\frac{2}{3}} \begin{bmatrix} \cos(\theta w + 90°) \\ -\sin(\theta w + 90°) \end{bmatrix} x \quad (4)$$

With continuing reference to FIG. 8, The sensor phase orthogonal direction correction amounts (id.crr.x, iq.crr.x) are calculated in the above-described manner. The d/q axis electric current estimate values (id.est, iq.est) are corrected by the amounts (id.crr.x, iq.crr.x).

In the first embodiment, the dq conversion, the correction process, and the inverted dq conversion are configured to be repeated at predetermined intervals. The dq conversion calculates the d/q axis electric current estimate values id.est and iq.est based on the electric current detection value iw.sns of the sensor phase by the sensor 15 and the electric current estimate values iu.est and iv.est in two other phases of the previous cycle. The correction process, at a time of dq conversion, corrects the d/q axis electric current estimate values id.est and iq.est in the orthogonal direction that is orthogonal to the sensor phase axis. The inverted dq conversion calculates the electric current estimate values iu.est and iv.est of other two phases of U and V based on smoothed values id.lpf and iq.lpf that are derived from the LPF process (e.g., an annealing/averaging process, a first order lag process, or the like) performed on the d/q axis electric current estimate values id.est and iq.est that were corrected. The inverted dq conversion may also calculate the electric current estimate value of the sensor phase (iw.est).

Figure 11:
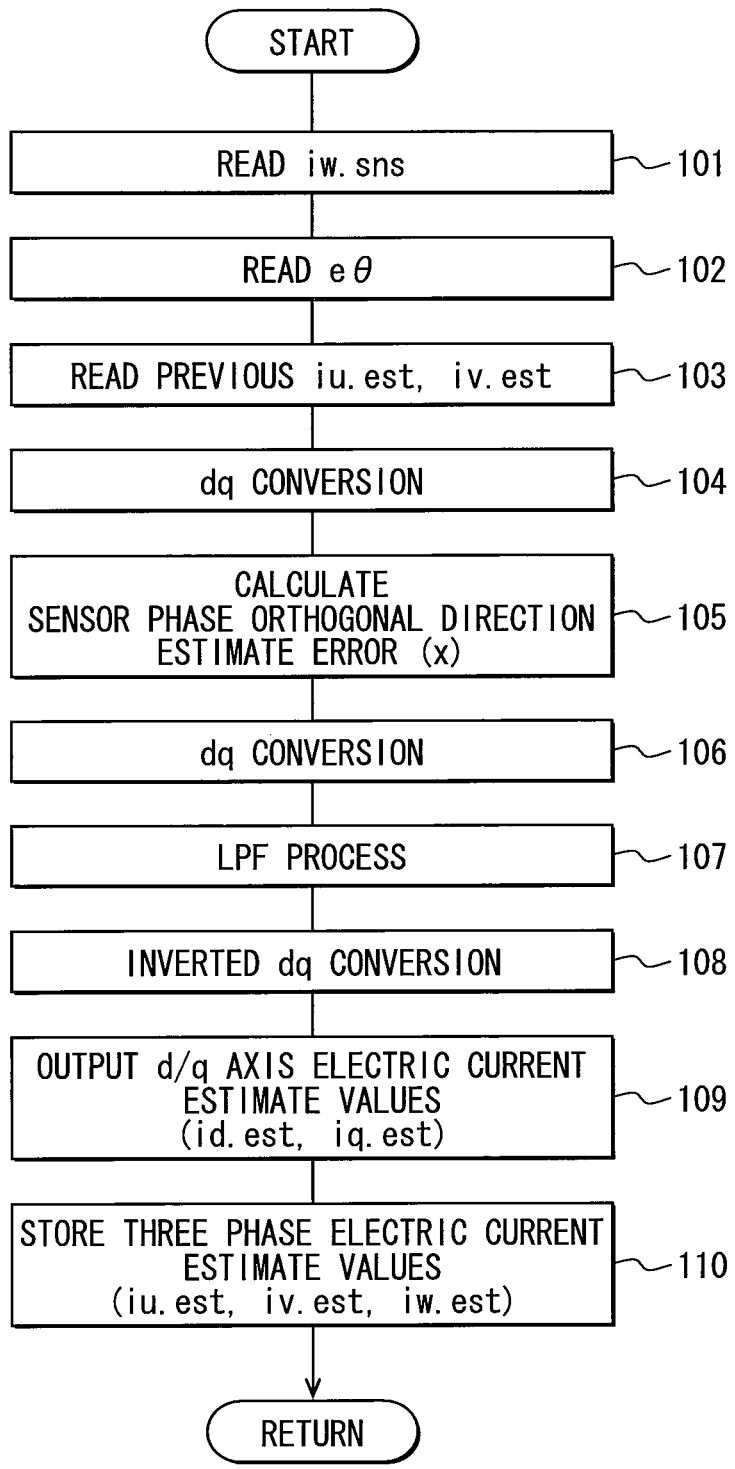
FIG. 11 is a flowchart of an electric current estimation routine.

The electric current estimation of the present embodiment is performed as a routine shown in FIG. 11 by the motor control circuit 16. The details of the routine in FIG. 11 are described in the following.

The electric current estimation routine in FIG. 11 is executed during a power on period of the motor control circuit 16 at a calculation cycle of T in a repeated manner. After the start of execution of the routine, the motor control circuit 16 reads the electric current detection value iw.sns of the sensor phase (i.e., W phase), which is detected by the electric current sensor 15, at 101, and reads, at 102, the electric angle eθ. The electric angle eθ is calculated from the rotor position mθ of the AC motor 13, which is detected by the rotor position sensor 14.

The motor control circuit 16 reads the electric current estimate values iu.est, iv.est of two phases other than the sensor phase of the previous cycle, at 103. In the first cycle of the routine after the start of the power supply for the motor control circuit 16, for which there is no previous cycle, the electric current estimate values iu.est, iv.est are both set to zero. In other words, the initial values of iu.est and iv.est are both zero.

The motor control circuit 16 then performs the dq conversion for calculating the d/q axis electric current estimate values id.est and iq.est, at 104, based on the electric current detection value of the sensor phase (iw.sns) and the electric current estimate values of other two phases (iu.est and iv.est).

By using equation 2, the motor control circuit 16 then calculates the parameter x (i.e., the sensor phase orthogonal direction estimate error) along an orthogonal direction that is orthogonal to the sensor phase axis (i.e., W phase axis) at 105. Per equation 2, the motor control circuit 16 uses the current value of the sensor phase estimate error Δiw(n), the previous value of the sensor phase estimate error Δiw(n−1), and the electric angle shift amount Δθ. The calculation of parameter x is illustrated as the orthogonal direction error calculation unit of the orthogonal direction correction unit 18 (FIG. 10).

Based on the parameter x calculated in 105, the motor control circuit 16 performs the dq conversion, at 106, to calculate the d/q axis electric current correction values id.crr.x and iq.crr.x along the orthogonal direction that is orthogonal to the sensor phase axis. The dq conversion at 106 is represented as the dq conversion of the orthogonal direction correction unit 18 (FIG. 10). In such dq conversion, the d/q axis electric current correction values id.crr.x and iq.crr.x are calculated by using equation 4.

The motor control circuit 16, at 107, then smoothes the d/q axis electric current estimate values id.est, iq.est that are corrected by the d/q axis electric current correction values id.crr.x and iq.crr.x (i.e., corrected by the orthogonal component along the orthogonal direction that is orthogonal to the sensor phase axis (i.e., W phase axis)), by the LPF process, which may be an annealing process, a first order lag process, or the like. Based on the smoothed values id.lpf and iq.lpf that are derived from the LPF, the motor control circuit 16 performs the inverted dq conversion to calculate the electric current estimate values of three phases: iu.est, iv.est, and iw.est.

At 109, the motor control circuit 16 outputs the d/q axis electric current estimate values id.est, iq.est. The values id.est, iq.est are, for example, used for the electric current F/B control described above. The values id.est, iq.est may also be the values corrected by id.crr.x and iq.crr.x.

The motor control circuit 16 stores the three electric current estimate values iu.est, iv.est, and iw.est including the current sensor phase in the buffer (i.e., into a memory area), at 110, and the routine concludes itself. The electric current estimate values of the two phases except for the sensor phase or the electric current estimate values of all three phases, including the sensor phase, are used in the next execution cycle of the electric current estimation, in which the electric current estimate values (iu.est, iv.est, and iw.est) serve as the values from the previous cycle.

Figure 12A:
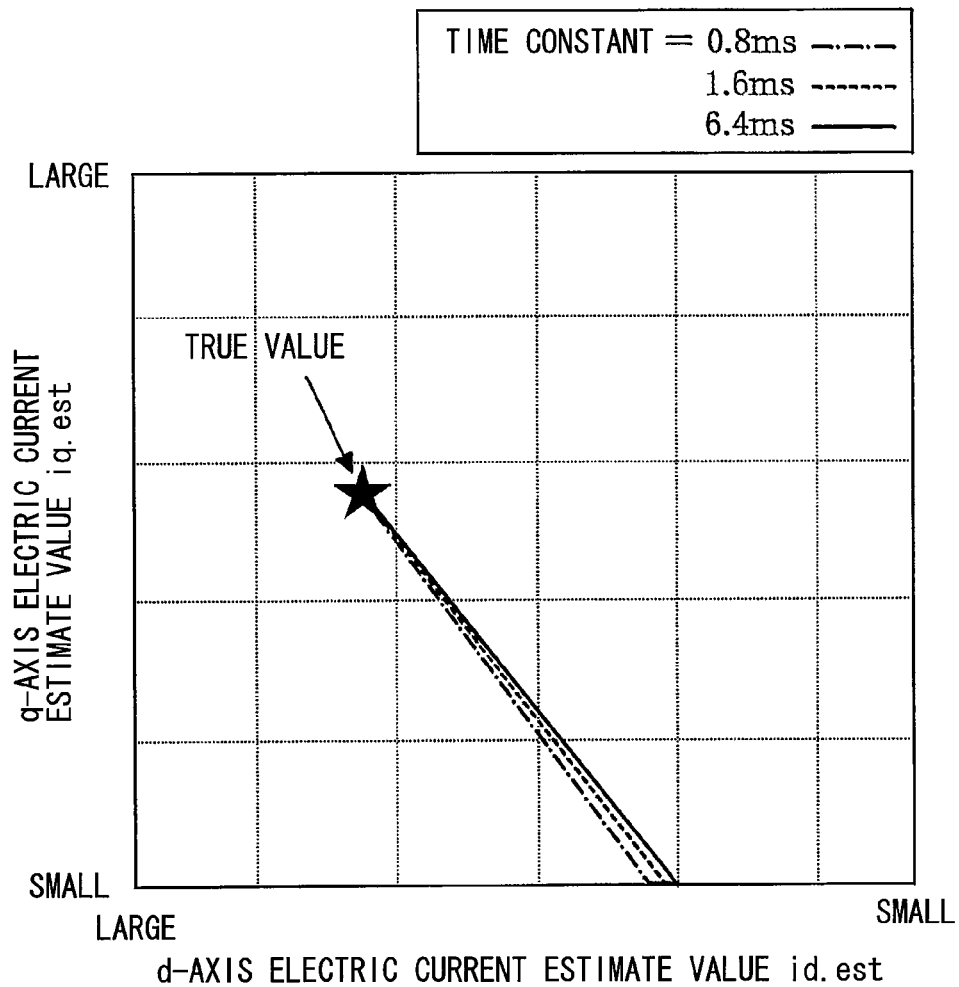
FIGS. 12A and 12B are graphical views of an electric current estimate determined by the electric current estimate unit of FIG. 8.
Figure 12B:
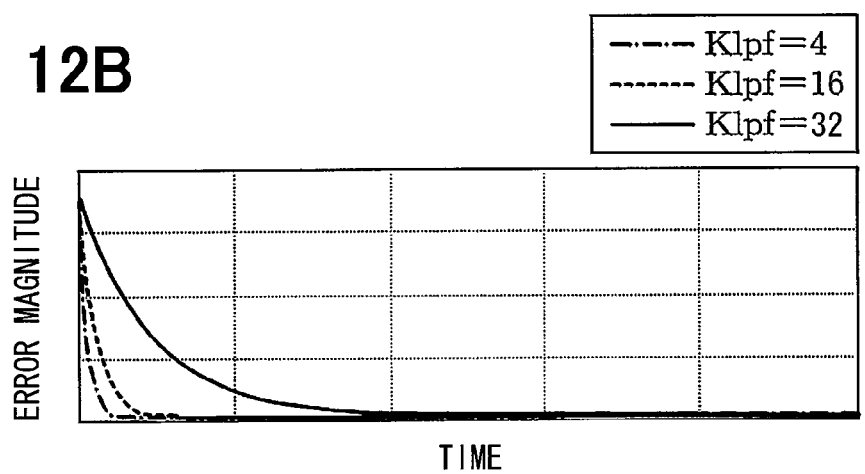

The electric current estimation process in the first embodiment improves the responsiveness of the d/q axis electric current estimate values (id.est, iq.est) due to the prevention of the swirl shape behavior of the d/q axis electric current estimate values in the low rotation number range, as shown in FIGS. 12A, 12B. In particular the estimate values id.est and iq.est linearly converge to a true value (i.e., an actual electric current value). The improved responsiveness is enabled by the calculation and correction scheme of the d/q axis electric current estimate values.

Specifically, the electric current estimation process of the first embodiment calculates the sensor phase orthogonal direction estimate error x in the orthogonal direction that is orthogonal to the sensor phase axis based on the current and previous values of the sensor phase estimate error $\Delta iw(n)$, $\Delta iw(n-1)$, respectively (i.e., estimation error in the sensor phase). Further, the electric current estimation process calculates the d/q axis electric current correction values id.crr.x, iq.crr.x based on the sensor phase orthogonal direction electric current estimate error x, and, subsequently, corrects the previous d/q axis electric current estimate values id.est, iq.est based on the correction values id.crr.x, iq.crr.x in the orthogonal direction to determine a corrected estimate values id.est and iq.est in the orthogonal direction that is orthogonal to the sensor phase axis.

Further, in the present embodiment, the "vibration" type fluctuation of the d/q axis electric current estimate values id.est, iq.est is prevented. Therefore, a stable F/B control of the AC motor 13 is realized.

In the present embodiment, the quick convergence of the d/q axis electric current estimate values id.est, iq.est to the actual electric current value is enabled by the improved responsiveness of the electric current estimation in the F/B control of the power supply for the motor 13 in response to the change of the actual electric current, thereby achieving high responsiveness in the torque control of the AC motor 13.

The direct estimation of the d/q axis estimate values id.est, iq.est based on the electric current detection value of one phase in the F/B control, in principle, prevents a secondary fluctuation of the output torque due to the error of gains between two or more electric current detection sensors. In other words, the torque fluctuation due to the fluctuation of the d/q axis electric current at an electric current secondary frequency is prevented.

The present disclosure, prevents torque fluctuation by improving the responsiveness of the electric current estimate values and by decreasing the error of the estimated current (i.e., the first order fluctuation of the electric current by the direct current components of the three phase electric current, the second order fluctuation of the electric current by the shift of the amplitude). Thus, decreasing the vibration of the motor at a time of steep change of the required torque in the motor-applied system, and enabling a quick output of the required torque. Therefore, application of the present disclosure to the control of the in-vehicle motor is especially advantageous for achieving a high standard of comfort and the sophisticated drivability for the vehicle occupant.

The first embodiment is also applicable to a system that uses the previous d/q axis electric current estimate values and the sensor phase electric current detected by the electric current sensor 15 for the calculation of the current d/q axis electric current estimate values.

Figure 13:
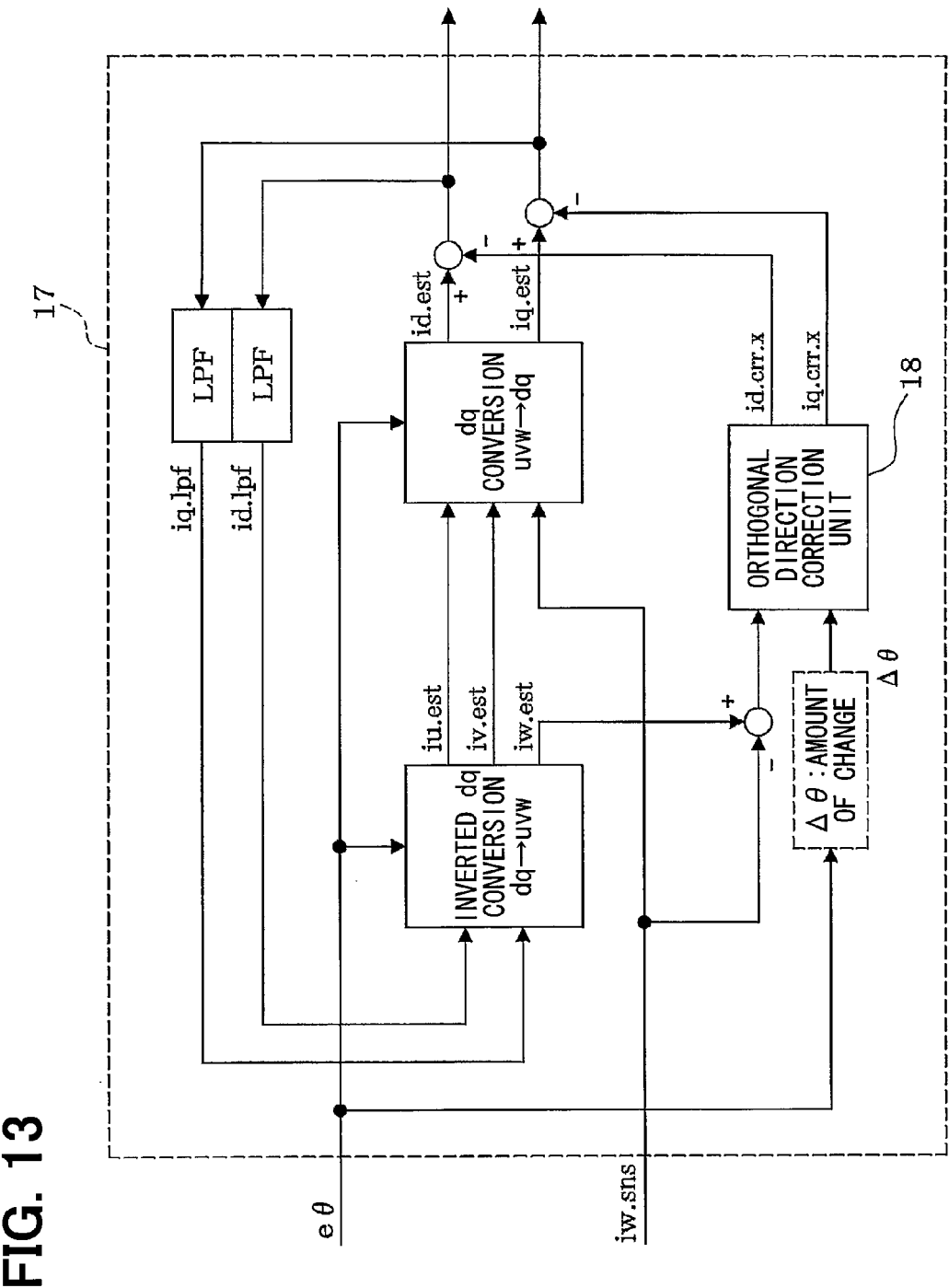
FIG. 13 is a block diagram of an electric current estimate unit in a second embodiment of the present disclosure.

With reference to FIG. 13, in a second embodiment of the present disclosure a system of repeating the inverted dq conversion and the dq conversion at predetermined interval with an addition of a correction logic that corrects the d/q axis electric current estimate values (id.est, iq.est) in the orthogonal direction that is orthogonal to the sensor phase axis. The system of the second embodiment also improves responsiveness.

More practically, the system of the second embodiment repeats, at predetermined intervals the inverted dq conversion and the dq conversion. Based on smoothed values id.lpf and iq.lpf of the previous cycle, which are smoothed by performing the LPF process on the corrected d/q axis electric current estimate values id.est and iq.est, the inverted dq conversion calculates the electric current estimate values iu.est and iv.est of other two phases of U and V. The dq conversion calculates the d/q axis electric current estimate values id.est and iq.est based on the electric current estimate values iu.est and iv.est in other two phases from the inverted dq conversion and the electric current detection value iw.sns of the sensor phase.

When calculating the d/q axis electric current estimate values id.est and iq.est, the d/q axis electric current estimate values id.est and iq.est may be corrected in the orthogonal direction that is orthogonal to the sensor phase axis based on (a) the calculation of the electric current estimate value iw.est, which is based on the d/q electric current estimate values id.est and iq.est of the previous cycle, and (b) the sensor phase estimate error $\Delta iw$ that is derived from the electric current estimate value iw.est and the electric current detection value iw.sns.

Figure 14:
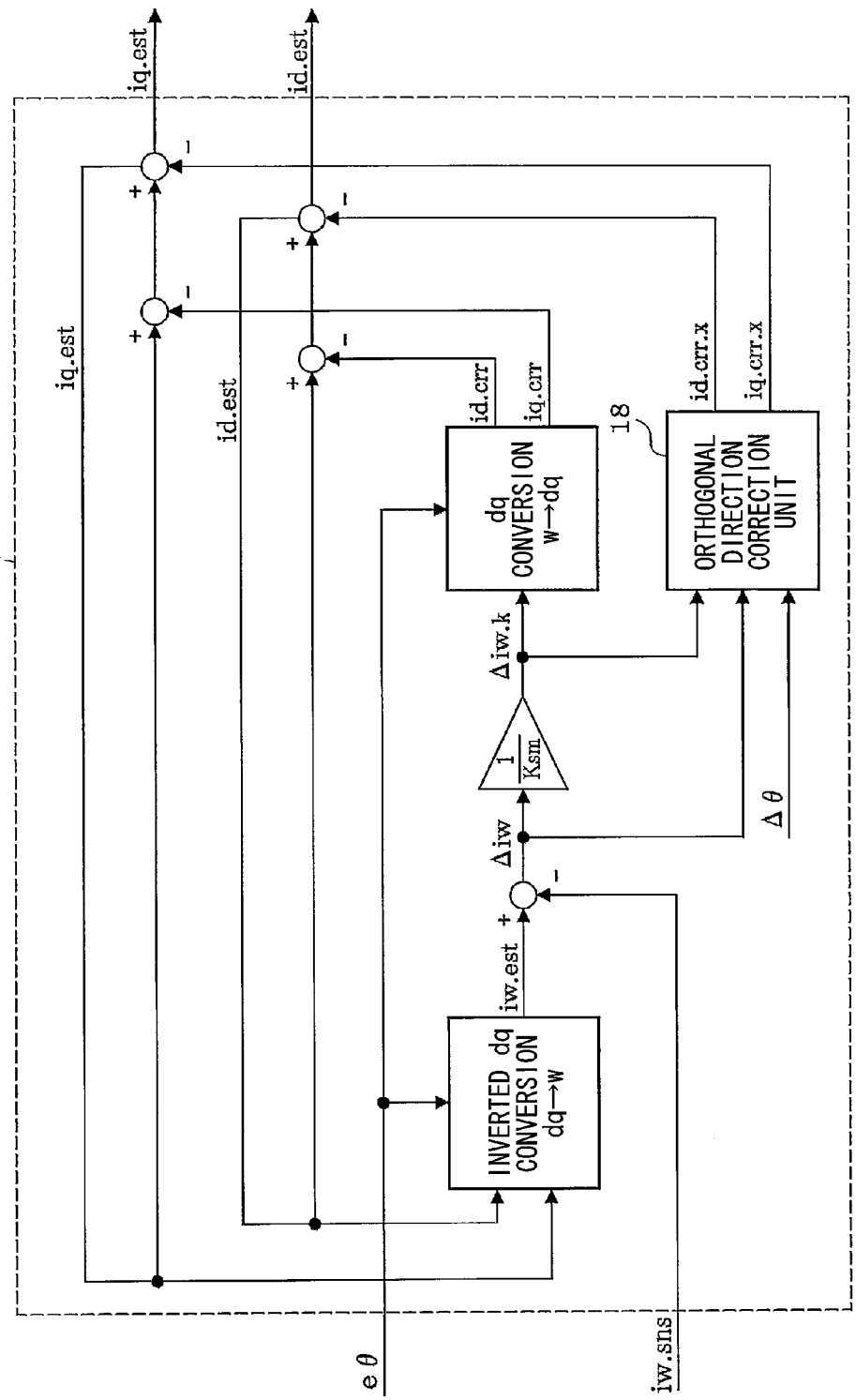
FIG. 14 is a block diagram of an electric current estimate unit in a third embodiment of the present disclosure.

Alternatively, a system in a third embodiment of the present disclosure, which is shown in FIG. 14, performs the inverted dq conversion, the dq conversion, and the correction process with an addition of a correction logic. The correction logic corrects the d/q axis electric current estimate values id.est, iq.est in the orthogonal direction that is orthogonal to the sensor phase axis, which also improves responsiveness.

Specifically, in the third embodiment, the system repeats, at predetermined intervals, (1) the inverted dq conversion, (2) the dq conversion, (3) the calculation of $\Delta iw$, (4) the calculation of the d/q axis electric current correction values id.crr.x and iq.crr.x, and (5) the calculation of the d/q axis electric current estimate values of the current cycle. The inverted dq conversion calculates the sensor phase electric current estimate value iw.est based on the d/q axis electric current estimate values id.est and iq.est of the previous cycle. The dq conversion calculates a d/q axis electric current correction values that are in the same direction as the sensor phase axis based on the sensor phase estimate error $\Delta iw$ that is derived from the electric current estimate value iw.est of the sensor phase and the electric current detection value iw.sns of the sensor phase.

The d/q axis electric current correction values id.crr.x and iq.crr.x in the orthogonal direction that is orthogonal to the sensor phase axis are calculated based on the sensor phase estimate errors of the previous cycle $\Delta iw(n-1)$ and the current cycle $\Delta iw(n)$. Subsequently, the d/q axis electric current estimate values id.est and iq.est of the current cycle is calculated by correcting the d/q axis electric current estimate values id.est and iq.est of the previous by using (A) the d/q axis electric current correction values id.crr and iq.crr in the same direction as the sensor phase axis and (B) the d/q axis electric current correction values id.crr.x and iq.crr.x in the orthogonal direction that is orthogonal to the sensor phase axis.

Further, the calculation for calculating the electric current estimate error in the orthogonal direction that is orthogonal to the sensor phase axis and/or the calculation for calculating the electric current correction value in the orthogonal direction that is orthogonal to the sensor phase axis may be performed by other appropriate methods other than the methods in various embodiments.

In the second and third embodiments, the values of the previous cycles are the d-axis value and the q-axis value, which are the values of the direct electric current. Therefore, the influence of the change of the rotation angle and the electric current of the AC motor, which are changing between the previous cycle and the current cycle, decrease for the improved accuracy of the estimation of the electric current in the AC motor.

Further, the detection of the electric current by using the electric current sensor in W phase (i.e., in the sensor phase), in the present disclosure may be changed to another configuration, such as a detection of the electric current by using the electric current sensor in U phase or in V phase.

Figure 15:
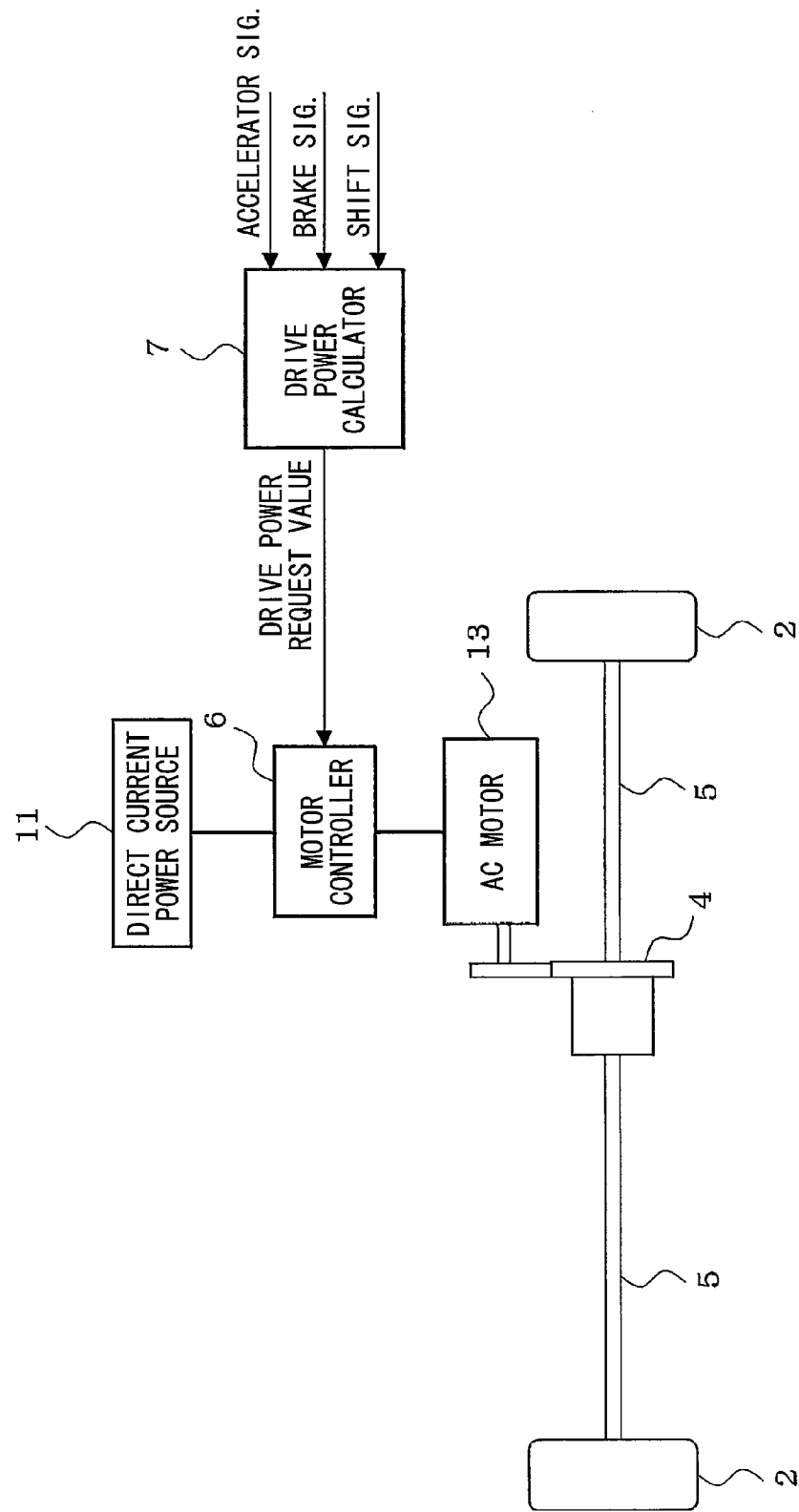
FIG. 15 is a block diagram of a drive system of a battery vehicle of the present disclosure.

Further, the present disclosure may be applicable to a drive system of an electric vehicle shown in FIG. 15. More practically, the drive system of the electric vehicle may have the AC motor 13 installed in the vehicle, and may drive wheels 2 by a driving force from the AC motor 13. The AC motor 13 is connected to a direct current power source 11 through a motor controller 6, which includes, for example, an inverter 12 (FIG. 2) and a motor control circuit 16 (FIG. 2). That is, the power source 11 having a secondary battery or the like may supply the direct current for the motor 13 through the controller 6, or may receive the direct current from the motor 13 through the controller 6.

The drive power calculator 7 is a computer or a similar part that controls the hybrid vehicle, and detects a vehicle's driving condition by reading signals from various sensors and devices such as an accelerator sensor, a brake switch, a shift switch and the like (sensors and switches not illustrated).

The drive power calculator 7 transmits and receives a control signal, a data signal and the like to and from the motor control circuit 16 that controls an operation of the AC motor 13, and controls the drive power of the AC motor 13 by outputting a drive power request value according to the driving condition of the vehicle.

The present disclosure, i.e., the drive system described above, may also be applicable to such drive system of the electric vehicle, for achieving the improved accuracy of the electric current estimation for the control of the AC motor, by devising the single-phase sensing of electric current (one sensor for one motor), which achieves the cost reduction as well.

Furthermore, the configuration of the above embodiment, which is an application of the present disclosure to a system having one set of the inverter and the motor, may be changed to different configurations, such as a hybrid system in FIG. 1, e.g., a system having two or more sets of the inverter and the motor.

Furthermore, the present disclosure may also be applicable to the AC motor control apparatus in other types of systems other than the electric vehicle system or the hybrid vehicle system described above.

Such changes and modifications are to be understood as being within the scope of the disclosure as defined by the appended claims.

What is claimed is:

1. A control apparatus of an alternate current (AC) motor, which includes a three-phase AC motor and an electric current detector for detecting an electric current, as an electric current detection value, in a sensor phase, which is one phase of the three-phase AC motor, the control apparatus comprising:
   an electric current estimation unit repeatedly performing an electric current estimation process by calculating a d/q axis electric current estimate values in a rotation coordinate system of the AC motor and calculating an electric current estimate values of each phase of the AC motor, wherein
   the d/q axis electric current estimate values are based on the electric current detection value of the sensor phase detected by the electric current detector and on the electric current estimate values of phases other than the sensor phase from a previous cycle that are stored in memory,
   the electric current estimate values of each phase of the AC motor are based on smoothed values derived from smoothing the d/q axis electric current estimate values, and
   during the calculation of the d/q axis electric current estimate values, the electric current estimation unit calculates the electric current estimate value of the sensor phase based on the d/q axis electric current estimate values of the previous cycle that are stored in memory, and corrects the d/q axis electric current estimate values in a sensor phase orthogonal direction that is orthogonal to the sensor phase axis based on a sensor phase estimate error that is derived from the electric current estimate value of the sensor phase and the electric current detection value of the sensor phase detected by the electric current detector.

2. The control apparatus of claim 1, wherein,
   the electric current estimation unit, when correcting the d/q axis electric current estimate values in the sensor phase orthogonal direction, calculates a sensor phase orthogonal direction estimate error based on the sensor phase estimate error of the previous cycle and the sensor phase estimate error of a current cycle, and
   the electric current estimation unit calculates a d/q axis electric current correction values in the sensor phase axis orthogonal direction to correct the d/q axis electric current estimate values of the previous cycle, the d/q axis electric current correction values are based on the sensor phase orthogonal direction estimate error.

3. The control apparatus of claim 1, wherein
   the electric current estimation unit repeats, at predetermined intervals, an inverted dq conversion and a dq conversion, the inverted dq conversion calculates the electric current estimate values of all three phases of the three phase AC motor based on the d/q axis electric current estimate values of the previous cycle, the dq conversion calculates the d/q axis electric current estimate values based on the electric current detection value of the sensor phase and the electric current estimate values of phases other than the sensor phase from the inverted dq conversion, and
   during the dq conversion, the electric current estimation unit corrects the d/q axis electric current estimate values in the sensor phase orthogonal direction based on the electric current estimate value of the sensor phase calculated by the inverted dq conversion and on the sensor phase estimate error derived from the electric current estimate value of the sensor phase and the electric current detection value of the sensor phase.

4. The control apparatus of claim 1 further comprising:
a controller for controlling a power supply for the AC motor based on the d/q axis electric current estimate values.

5. The control apparatus of claim 2, wherein
the electric current estimation unit repeats, at predetermined intervals, an inverted dq conversion, a dq conversion, an orthogonal direction correction process, and calculation of the d/q axis electric current estimate values of the current cycle,
the inverted dq conversion calculates the electric current estimate value of the sensor phase based on the d/q axis electric current estimate values of the previous cycle,
the dq conversion calculates d/q axis electric current correction values in a same direction as the sensor phase axis based on the sensor phase estimate error that is derived from the electric current estimate value of the sensor phase determined by the inverted dq conversion and the electric current detection value of the sensor phase detected by the electric current detector,
the orthogonal direction correction process calculates the d/q axis electric current correction values in the sensor phase orthogonal direction based on the sensor phase estimate error of the previous cycle and the sensor phase estimate error of the current cycle, and
the d/q axis electric current estimate values for the current cycle are determined by correcting the d/q axis electric current estimate values of the previous cycle with the d/q axis electric current correction values in the same direction as the sensor phase axis determined by the dq conversion and with the d/q axis electric current correction values in the sensor phase orthogonal direction determined by the orthogonal direction correction process.

* * * * *